Sept. 22, 1942.    G. H. PAGE    2,296,400
FILTER LUBRICATION FITTING
Filed April 15, 1941    2 Sheets-Sheet 1

Inventor
Glen H. Page
By Clarence A. O'Brien
Attorney

Sept. 22, 1942.        G. H. PAGE        2,296,400
FILTER LUBRICATION FITTING
Filed April 15, 1941        2 Sheets-Sheet 2

Inventor
Glen H. Page
By Clarence A. O'Brien
Attorney

Patented Sept. 22, 1942

2,296,400

UNITED STATES PATENT OFFICE 2,296,400

FILTER LUBRICATION FITTING

Glen H. Page, Salt Lake City, Utah

Application April 15, 1941, Serial No. 388,671

1 Claim. (Cl. 184—105)

My invention relates to improvements in pressure lubricating fittings for automotive and other equipment, and the primary object of my invention is to provide a simple, practical and efficient arrangement of this character which will prevent dirt and gritty material from passing through the grease fitting to the bearing surfaces lubricated thereby.

Other important objects and advantages of my invention will be apparent from a reading of the following description taken in connection with the appended drawings, wherein for purposes of illustration I have shown a preferred embodiment of my invention.

Figure 1:
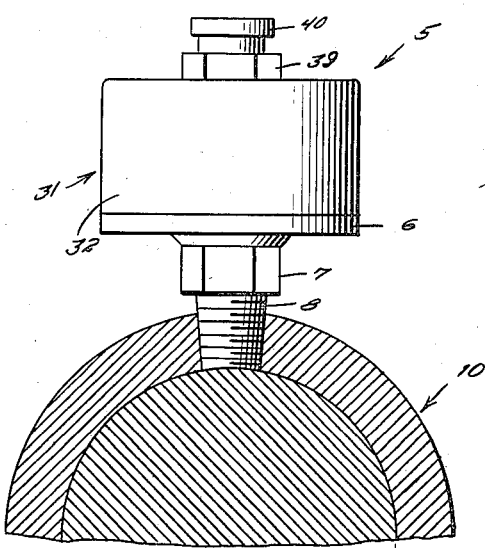
Figure 1 is a transverse vertical sectional view taken through a bearing structure showing an arrangement in accordance with the present invention applied thereto, the latter being shown in side elevation.
Figure 2:
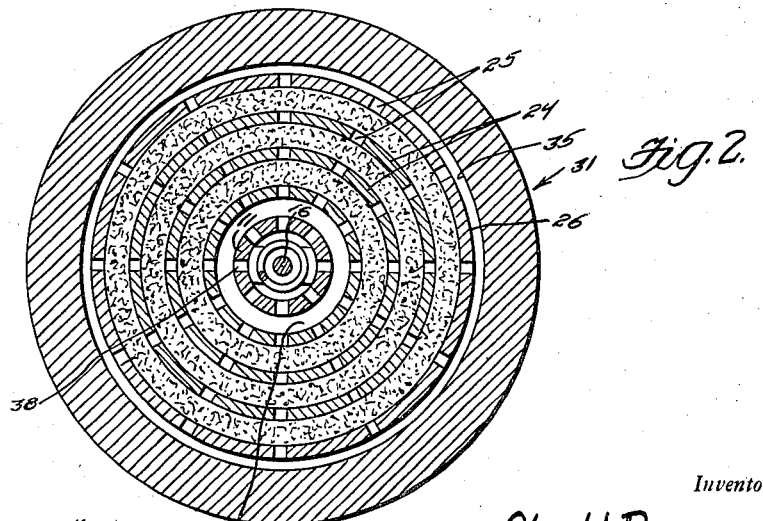
Figure 2 is an enlarged horizontal sectional view taken through Figure 1 along the line 2—2 and looking downwardly in the direction of the arrow.
Figure 6:
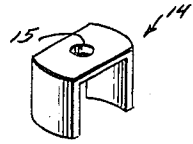
Figure 6 is a view in perspective of the saddle.

Referring in detail to the drawings, the numeral 5 generally designates the present filter grease fitting which comprises a circular base plate 6 having depending therefrom the concentric heavy boss 7 from which, in turn, depends axially the threaded portion 8 which is threaded into the opening 9 in the bearing structure which is generally designated 10. Projecting upwardly from the plate 6 in axial alignment with the elements 7 and 8 is the relatively thin walled tubular portion 11 which is constricted at its upper end as indicated by the numeral 12 to define a valve seat. The bore of the tubular element 11 is formed continuous with and in extension of the bore 13 which extends through the elements 7 and 8 to afford passage for the grease into the bearing structure 10.

An inverted U-shaped saddle 14 is securably mounted in the bore of the tubular portion 11 and is provided in the center of its bight portion with an opening 15 to slidably receive and guide the valve stem 16 on the check valve 17 which cooperates with the seat 12 to close the opening in the upper end of the tubular element 11. A helical spring 18 circumposed on the valve stem between the saddle 14 and the valve holds the valve 17 normally in closed position.

An annular wall 19 rises from the top of the plate 6 adjacent its outer edge, the said wall being threaded on its outer side as indicated by the numeral 20. The exterior of the lower part of the tubular portion 11 is also threaded as indicated by the numeral 21 to accept the threads formed in the central hole in the circular spreader plate 22 which when screwed in place engages the top side of the plate 6. The spreader plate or disk 22 is formed with the circumferential series of grooves 23 in its top to accept and support the lower ends of cylindrical separators 24 which are perforated at intervals as indicated by the numeral 25. The outermost perforated cylinder 26 has its lower edge crimped as indicated by the numeral 27 under the beveled outer edge of the separator disk for retention purposes. The outer perforated cylinder 26 is formed integral with the plate-like top 28 of the filter element, the bottom of which rests on the upper ends of the other separator cylinders, the said top being imperforate and slightly spaced as indicated by the numeral 29 from the underside of the top plate 30 of the upper housing which is generally designated 31 and whose cylindrical skirt 32 is cut away at the inner side of its lower edge to define a shoulder 33 to rest on a gasket 34 on the upper end of the annulus 19. The radially inward side of the remaining portion of the edge of the skirt 32 is internally threaded to accept the threads 20 on the annulus 19 whereby the base 6 and the housing 31 are assembled.

Figure 3:
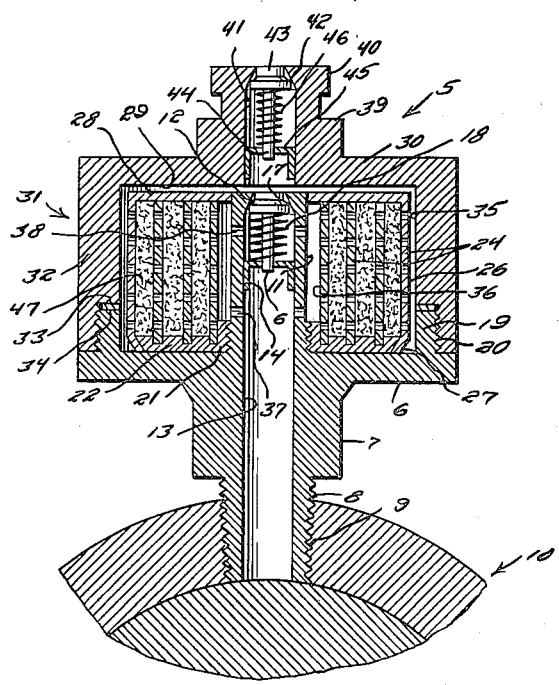
Figure 3 is a fragmentary enlarged transverse vertical sectional view taken approximately centrally through Figure 1.
Figure 4:
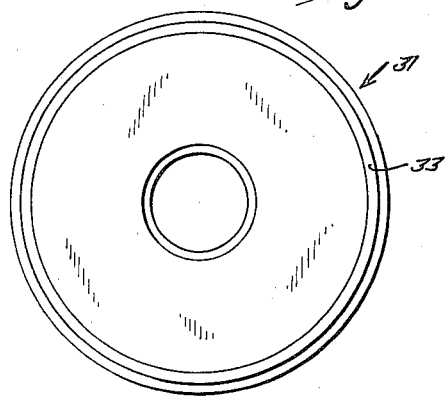
Figure 4 is a bottom plan view of the removable housing.
Figure 5:
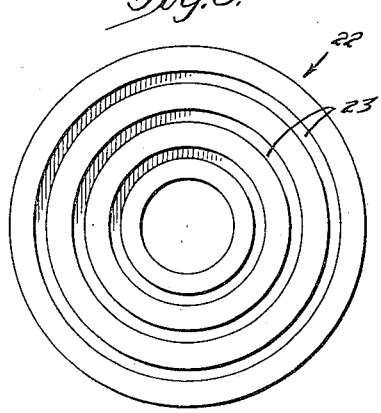
Figure 5 is a top plan view of the spacer disk.

As indicated in Figure 3 of the drawings the outer side of the outer perforated cylinder 26 is spaced from the inner side of the skirt 32 of the outer housing as indicated by the numeral 35 to provide a lubricant passage, and that the innermost perforated cylinder is substantially spaced as indicated by the numeral 36 from the tubular element 11.

The said tubular element 11 is provided with circumferentially spaced horizontal passages 37 which are located below the saddle 14 and with other similar passages 38 which are positioned above the saddle 14 but below the closed position of the valve 17.

The top 20 of the housing 31 has an upright projection 39 which like the boss 7 is in the form of an hexagonal nut, and above this rises the fitting nipple 40 of the desired type, these elements having in common the bore 41 which opens through the bottom of the top 30 to communicate with the space 29 above the filter element and is constricted at its upper end as indicated by the numeral 42 to define a valve seat with which cooperates the check valve 43. The check valve has its stem 44 sliding in and guided by an opening in a saddle 45 secured in the lower part of the bore 41 with a closing spring 46 circumposed on the valve stem between the head of the valve and the saddle to normally keep the valve closed. The particular types of valves 43 to be used will depend on the type of lubrication fitting and lubrication system used. The check valve 17 is in the nature of a by-pass valve.

The spaces between the perforated cylinders of the filter element are filled with suitable filtering material 47 devised to allow the passage of grease therethrough while stopping and retaining all solid material, thereby preventing such material from entering the bearing structure 10.

The pressure grease hose being applied to the nipple 20 in a well known manner, the pressure of the grease entering the upper end of the bore 41 forces the valve 43 open and allows the grease to pass down through the bore 41 and into the space above the filter element and thence down along the inner side of the skirt 32 of the housing 31 and then through the perforations in the outer cylinder 26, and by stages laterally inwardly until the grease in this movement has passed through several stages of relinquishment of its solid content, and enters the central chamber 36 to pass through the lower openings 37 into the bore 13 and thence into the bearing structure 10. The by-pass valve 17 is designed to open under a predetermined grease pressure so as to allow grease from the chamber 29 to pass downwardly through the upper part of the bore 13 and pass laterally outwardly through the openings 38 in the tubular element 11 into the space 36 and thence pass into the bore 13 through the lower openings 37. This arrangement is provided so that flushing action will be prevented in the event that the filter element becomes clogged with dirt. Otherwise the dirt lodged in the filtering material would enter the passage 36 and pass into 13 and thence into the bearing 10. The arrangement also controls the lubricant pressure on the filtering element and forms a passage for the lubricant to the bearing in the event the filtering element becomes clogged with dirt.

Although I have shown and described herein a preferred embodiment of my invention, it is to be definitely understood that I do not wish to limit the application of my invention thereto, except as may be required by the scope of the subjoined claim.

Having described the invention, what is claimed as new is:

A pressure lubrication fitting comprising a base plate having a central bored nipple projecting from one side thereof for attaching the fitting to a part to be lubricated, and a central tubular member projecting from the opposite side thereof in communication with the bore of said nipple, a housing secured to said base plate and including a side wall and an outer end wall spaced from the outer end of said member, a laminated annular filter body surrounding said member and spaced from the side wall and outer end of said housing, said filter body having outer and inner ends impervious to the passage of grease therethrough and being pervious intermediate said ends to the passage of grease under pressure therethrough from the space between the same and said side wall of the housing into the space between said body and said member, an inwardly opening valve in the outer end of said housing for admitting grease under pressure into the space between the filter body and the outer end and side wall of said housing, means including a valve chamber and an inwardly opening valve in the outer end of said member for admitting grease from said space into the outer end of said member in the event that the filter body becomes clogged, and means to bypass grease under pressure from said valve chamber through the space between said filter body and member back into said member at points intermediate the valve chamber and said base plate.

GLEN H. PAGE.